United States Patent [19]

Staten

[11] Patent Number: 4,726,824
[45] Date of Patent: Feb. 23, 1988

[54] AIR PURIFICATION SYSTEM

[76] Inventor: Michael D. Staten, 1266 S. Citrus Ave., #20, Los Angeles, Calif. 90019

[21] Appl. No.: 915,788

[22] Filed: Oct. 6, 1986

[51] Int. Cl.$^4$ .............................................. B01D 46/10
[52] U.S. Cl. .................... 55/274; 55/385 A; 73/23; 98/31.5; 98/34.5; 340/521
[58] Field of Search ............ 55/270, 274, 275, 385 A; 73/23; 98/31.5, 34.5, 108, 114; 236/44 A; 340/500, 501, 521, 632

[56] References Cited

U.S. PATENT DOCUMENTS

| | | | |
|---|---|---|---|
| 3,291,026 | 12/1966 | Simpson | 98/31.5 X |
| 3,739,707 | 6/1973 | Knapp | 98/34.5 |
| 3,984,826 | 10/1976 | Kowalsky | 340/632 X |
| 4,088,986 | 5/1978 | Boucher | 340/521 X |
| 4,340,885 | 7/1982 | Chavis et al. | 340/632 |
| 4,462,246 | 7/1984 | Advani et al. | 340/632 X |
| 4,477,263 | 10/1984 | Shaver | 55/385 A X |

OTHER PUBLICATIONS

Phoenix Precision Instrument Co., Bulletin No. IM 2000A, 1966.
Spectrometrics of Florida, Inc., The NO$_2$ Analyzer, Model Vd$^2$, 1972.

*Primary Examiner*—Charles Hart
*Attorney, Agent, or Firm*—Roger A. Marrs

[57] ABSTRACT

A complete system for indoor air pollution control and its components is disclosed herein, incorporating a furnace, heat pump or the like for supplying conditioned air to a room or zone via a duct network. Air filters are removably disposed at exhaust vents leading into the room or zone and intake vents are included for drawing air away from the room or zone for re-circulation. Ambient air intake vents are included in the duct network and the network is suitable for multiple level buildings. The system further includes sensing circuits within the duct work or zone which tests or senses the air for multiple characteristics of air quality and a panel having a variety of displays portrays the results of the individual characteristics being monitored. Such characteristics of air quality include ozone, carbon monoxide, nitrogen dioxide, etc.

1 Claim, 3 Drawing Figures

AIR PURIFICATION SYSTEM

BACKGROUND OF THE INVENTION

1. Field of the Invention

The present invention relates to air purification and more particularly to a novel system including an indoor air monitoring or sensing component which senses the room air for a multiplicity of air purification characteristics and which displays the results of these characteristics in a form available to occupants of the room or zone.

2. Brief Description of the Prior Art

In conventional buildings or dwellings, both old and new, the central heating and air-conditioning systems utilize various floor, wall and ceiling vents or registers as the terminating elements of the furnace duct network through which conditioned air is distributed to rooms or zones. Although the primary heat pump or furnace may be filtered as well as the ducting network may be filtered, the actual condition of the air within the room or zone is not monitored and occupants thereof have no assurance as to air quality. Such information is especially important in applications where physical activity take place such as in gymnasiums, business centers or the like wherein air quality is extremely important. Although the occupants of the room or zone may be aware that the air-conditioning system is filtered, it is not recognized what the actual component of the ambient air within the room actually is. Without such information, the beneficial results of physical training or other physical fitness programs may be seriously questioned and, in some instances, even be harmful to the participants.

Therefore, a long standing need has existed to provide a means for monitoring the air quality with respect to pollution or pollutant components within an enclosed room or zone that is occupied by persons having a need to know of the air quality.

SUMMARY OF THE INVENTION

Accordingly, the above problems and difficulties are obviated by the present invention which provides a novel air purification system for use with a conventional air ducting network having a furnace or air-conditioning unit intended to re-circulate air through a room or zone via a plurality of vents or registers. The system includes a monitoring apparatus coupled to the ducting network which automatically senses the circulating air to determine air quality characteristics with respect to pollution and which includes means for displaying the results of the sensing or testing so that the air quality characteristics are available to occupants of the room or zone. A major feature of the invention resides in the provision of multiple sensing devices so that a variety of pollutant characteristics of the air can be sensed, monitored and displayed. Thus, this invention helps correct the problem of indoor air quality.

Therefore, it is among the primary objects of the present invention to provide a complete air purification system which includes means for sensing, monitoring and displaying a variety of air characteristics such as concentrations of ozone, nitrogen dioxide, carbon monoxide, temperature and relative humidity.

Another object of the present invention is to provide a novel air purification system adapted to be installed with existing duct work in a building or dwelling so that the quality of air within a particular room or zone can be monitored with respect to pollution characteristics.

Still another object of the present invention is to provide a novel means in an air purification system for displaying the components of air within a room or zone so that the occupants therein may continuously monitor the quality of air within the room or zone.

And yet still another object of the present invention is to assure a constant level of clean air within a room or zone by means of a 10% room air volume exchange ratio.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
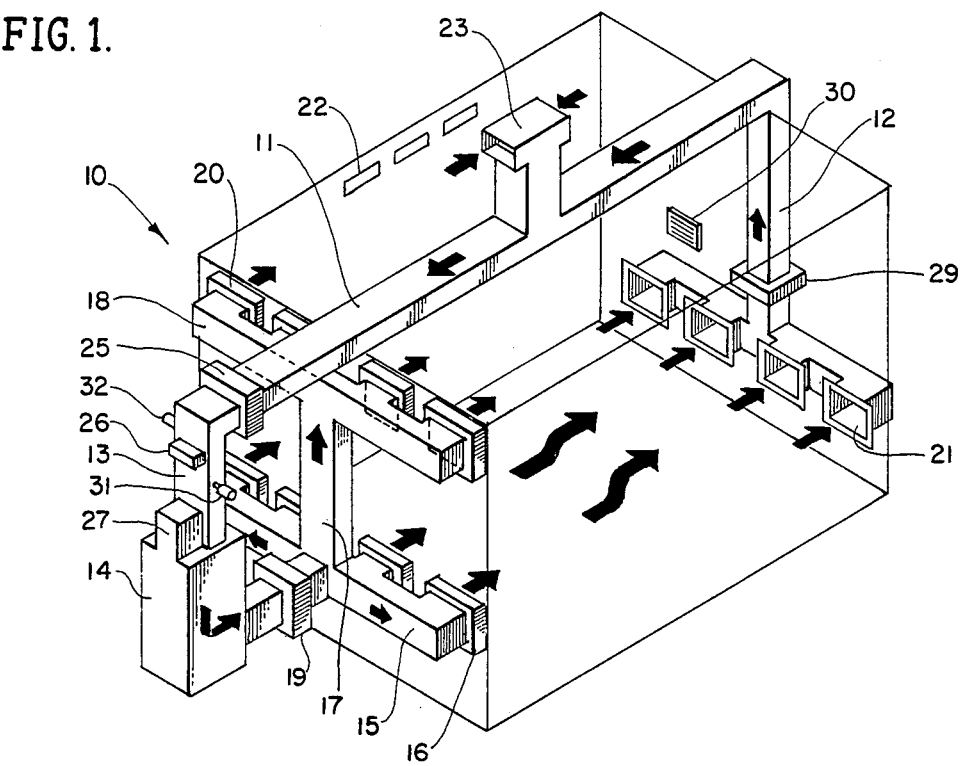
FIG. 1 is a diagrammatic view illustrating the novel air purification system of the present invention incorporating means for sensing and displaying the quality of air in a given zone or room, and insuring a particular rate of air flow (no perceptible draft).

Referring to FIG. 1, the novel air purification system representing the present invention is illustrated in the general direction of arrow 10 which includes a ducting network illustrated as being installed in a building having multiple floors or zones. The ducting network comprises an elongated duct 11 which interconnects an intake duct 12 with an exhaust duct 13. The exhaust duct 13 is connected to a conventional furnace or heat pump 14 that is connected via fan 19 to an outlet duct 15 having a plurality of registers, such as register 16 which includes an air filter arrangement. In the present instance, four outlet registers, dampers or the like are illustrated and each is provided with an absolute filter of micro-size (five microns) filter openings. Also, the ducting network includes an intermediate duct 17 which leads to a second story or tier duct 18 which outputs through additional registers or dampers such as illustrated by numeral 20. Again, the damper or register is provided with a suitable filter. Air introduced into the building, room or zone by the outlet registers or dampers 16, 20 are drawn into the ducting network by means of fan 29 through intake vents such as vent 21. These intake vents are connected to the exhaust duct 12 of the ducting network. Additional air flow vents are indicated by numeral 22 which may be connected to the main or central duct 11 in a manner similar to an air intake duct 23. This latter duct may be externally located with respect to the building so that environmental or ambient air from the environment may be introduced into the ducting network. These vents are fitted with both absolute filters and fans. The fans are chosen to move at a rate which will help induce air flow and room air volume exchange ratio of 10%.

It can also be seen that the actual air cleansing process includes an electrostatic filter 25, a charcoal filter 26 and an absolute filter 16 coupled with a humidifier.

The main feature of the present invention resides in the fact that the room or zone is provided with a data display panel 30 which suitably displays in graphic or cathode ray tube form what the environmental or pollution characteristics are of the air in the circulating system. The display 30 is part of a monitoring unit which derives information from a plurality of sensors in the ducting network, such as sensor 31 and sensor 32. These sensors are especially constructed to test the air passing through the system in order to determine different levels of pollution or pollutant constituents in the air such as ozone, nitrogen dioxide and carbon monoxide. The various filters provided throughout the ducting network are particularly designed to remove these pollutants or contaminants from the air flow system. However, the variety of sensors is operably connected to the display so that occupants in the room or zone may be alerted to the immediate air environment in which they are disposed as well as the air environment outside.

Figure 2:
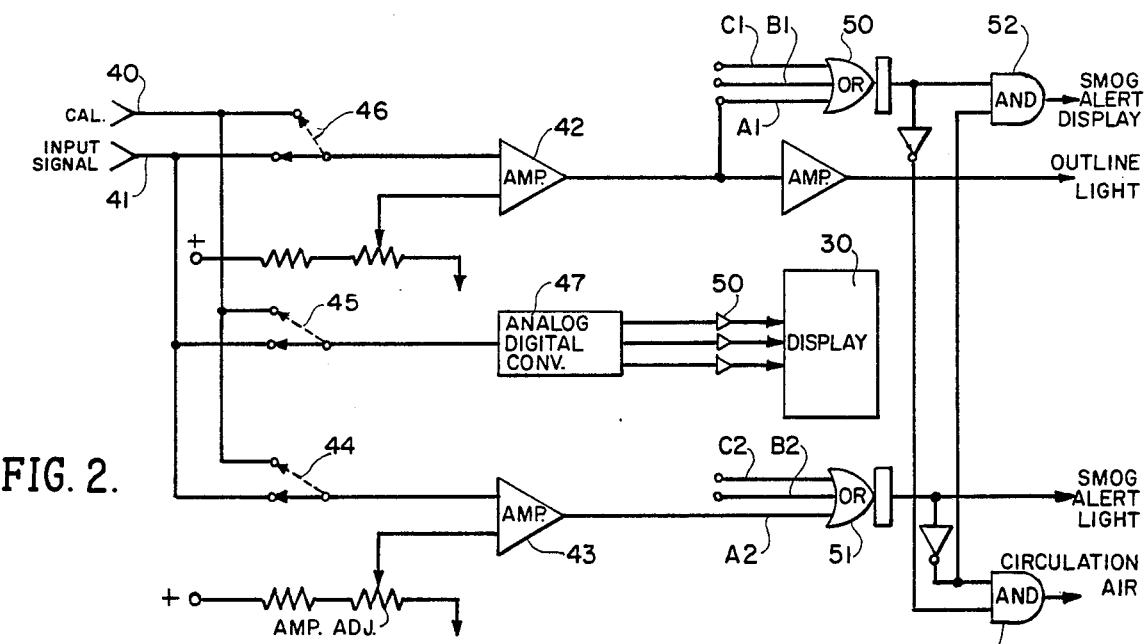
FIG. 2 is a diagrammatic circuit illustration of the monitoring unit included in the system shown in FIG. 1 for displaying the air quality characteristics.

Referring to FIG. 2, the novel monitoring unit of the present invention is illustrated. As illustrated in FIG. 2, it is to be understood that the circuit network is for a single sensor and that at least three of such circuits are provided for the sensing and displaying of air pollutant levels for ozone, nitrogen dioxide and carbon monoxide. For example, the three pollutants are sent by the aforementioned sensors which provide signals on leads C-1, B-1 and A-1. Calibration signals are introduced through the lead 40 while input signals for timing and other sensors are introduced to the circuit on lead line 41. Amplifiers 42 and 43 are switched into the system via switches 44 and 45 and switch 46 whereas the analog to digital converter 47 is connected in the single circuit by the switch 45. Driving circuits for operating digital display are indicated by numeral 50 while the digital display itself is indicated by numeral 30. The or circuit 50 receives signals from the sensors via lines C-1, B-1 and A-1 which are associated with one sensor while the or gate 51 receives inputs along its associated lines C-2, B-2 and A-2 from another sensor in the ducting network. Upon the operation of the gates 50 and 51, respective and gates 52 and 53 will function to set a level for energizing smog signal lights carried on the display 30. A smog alert light on display 30 is indicated by numeral 54 in FIG. 3. It should be noted that the circuit will be repeated twice for a total of three times for the three sensors mentioned and that they are connected in parallel for displaying the air characteristics and the pollutants sensed and removed.

Figure 3:
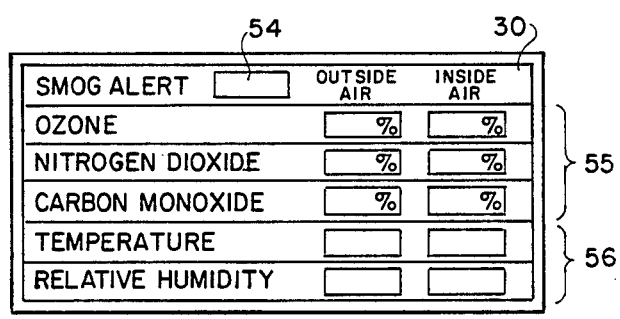
FIG. 3 is a graphic view showing the data display panel of the monitoring unit.

Referring now to FIG. 3, the display 30 is illustrated which not only shows the smog alert light 54 but shows percentages of outside and inside air for each of the respective pollutants. In addition, other information such as temperature and relative humidity is indicated for both outside air and inside air. The pollutant information is indicated by the boxes adjacent to the bracket 55 while additional characteristics of the air being circulated for both outside and inside air are indicated by the brackets associated with numeral 56.

Therefore, it can be seen that the present invention provides a novel air circulating system for purifying the air and which senses the air by suitable sensing means and displaying the results of the information with respect to pollutants and other characteristics of the air, such as temperature and humidity. The information is displayed to the occupants of the room or zone and it is envisioned that the system may be used in a single story or two story building.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A complete air purification and conditioning system for indoor air pollution control comprising:

a duct network interconnecting opposite ends of a room for circulating air therethrough;

inlet and outlet registers terminating the opposite ends of said duct network in opposing relationship at opposite ends of said room;

said duct network further having air-conditioning means for altering the condition of the air circulating through said duct network;

sensing circuit means within said duct network for testing or sensing the air for multiple chemical characteristics of air quality;

display means operably coupled to said sensing circuit means for portraying the results of the individual characteristics of air quality;

said display means includes a variety of individual air quality visual displays that include display of characteristics such as ozone, carbon monoxide, and nitrogen dioxide;

said display means is disposed within said room and said sensing means are disposed within said duct network;

said air circulation via duct network is responsive to said chemical sensing circuit means to assure a constant level of clean air within said room by means of a 10% room air volume exchange rate;

said chemical sensing circuit means includes a separate sensor for each chemical air quality characteristic and a separate display for displaying each chemical air quality characteristic;

a signal processing circuit interconnecting each sensor with its respective display for a given chemical air quality characteristic;

said signal processing circuit including calibration means and a smog alert display;

said calibration means and smog alert display being connected in parallel with other air sensors and displays in said system;

means connected to said sensing circuit means responsive to said sensors for setting control levels for energizing said smog display;

an air intake connected to said duct network for introducing ambient air to said system; and said air-conditioning means responsive to said sensing circuit means coupled thereto in conjunction with said display means for cooperatively altering the condition of the air circulating through said duct network and for dynamically displaying the altered chemical condition thereof.

* * * * *